Aug. 9, 1966         S. A. WINGATE         3,265,902
PHOTOELECTRIC SHAFT ANGLE ENCODER
Filed Jan. 3, 1963                     3 Sheets-Sheet 1

INVENTOR.
Sidney A. Wingate
BY
Morse & Altman

INVENTOR.
Sidney A. Wingate
BY
Morse & Altman

INVENTOR.
Sidney A. Wingate
BY
Morse & Altman

United States Patent Office 3,265,902
Patented August 9, 1966

3,265,902
PHOTOELECTRIC SHAFT ANGLE ENCODER
Sidney A. Wingate, Concord, Mass., assignor to Wayne-George Corporation, Newton, Mass., a corporation of Massachusetts
Filed Jan. 3, 1963, Ser. No. 249,286
8 Claims. (Cl. 250—233)

The present invention relates to shaft angle encoding by which digital information is generated as a function of angular position of the shaft and, more particularly, to the determination of extremely precise information in regard to shaft angularity and angular velocity via a so-called incremental encoder. In a typical incremental encoder, angular position is determined in conjunction with a coded component (e.g. a disk) that is provided about its periphery with a track of alternate increments (e.g. opaque and transparent) which alternately actuate (e.g. direct radiation toward and obscure radiation from) a suitable sensing component (e.g. a photoelectric transducer). Readout, in effect, involves counting the alternate increments from a reference point to provide pulses which digitally indicate shaft angularity or angular velocity. One limitation on angular resolution is incremental width along the code track, in other words, total number of increments physically specified (as by available light and structural limitations) in the code track. However, greater resolution than is so specified may be desired.

It has been found that angular displacement of an incremental encoder of the foregoing type causes the sensing component to produce an output signal that, as a practical matter, is sinusoidal. The primary object of the present invention is to utilize at least two sensing components of the foregoing type at different angular positions with respect to the code track in order to produce at least two wave forms that are displaced in phase from each other. These wave forms are analyzed by a vector summing component capable of dividing the minimum increments of the code track into smaller increments.

Another object of the present invention is to control the X and Y axes of a cathode ray tube by substantially sinusoidal signals of the foregoing type in order to present optically a scanning cycle and to permit this scanning cycle to be chopped into components by a suitable optical mask. The resulting sequence of optical pulses embody the increased resolution contemplated by the present invention.

A further object of the present invention is to modulate a pair of relatively high frequency carrier signals with substantially sinusoidal signals of the foregoing type in order to energize an electro-mechanical resolver or the like. The relatively high frequency signals so applied to the resolver embody the increased resolution contemplated by the present invention.

A further object of the present invention is to apply substantially sinusoidal signals of the foregoing type to a resistor matrix in order to generate across appropriately positioned taps a plurality of appropriately phased sinusoidal oututs, by which a succession of information representing pulses are produced. These pulses embody the increased resolution contemplated by the present invention.

A more specific object of the present invention is to combine an encoder of the foregoing type with a precision turntable of the type used to test gyros or the like. Such a turntable is designed to rotate at a precise angular velocity in order to test the output of a gyro mounted thereon. This combination of turntable and encoder is capable of developing angular velocity information of unprecedented precision and, consequently, gyro test information of exceptional accuracy.

Other objects of the present invention will in part be obvious and will in part appear hereinafter.

For a fuller understanding of the nature and objects of the present invention, reference should be had to the following detailed description, taken in connection with the accompanying drawing, wherein.

Figures 2, 3:
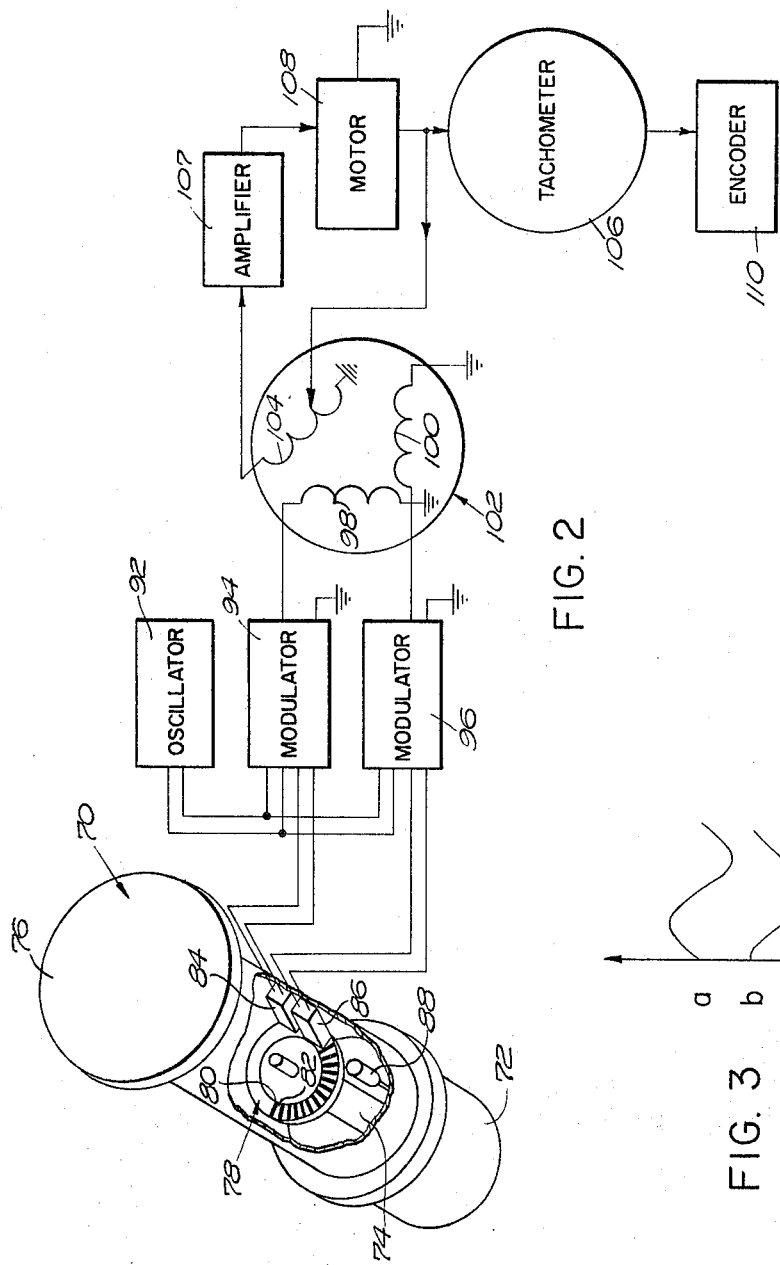
FIG. 2 is a diagrammatic view, partly in mechanical perspective and partly in electrical schematic, of a gyro test turntable and an encoding system, in combination, embodying the present invention.
Figure 6:
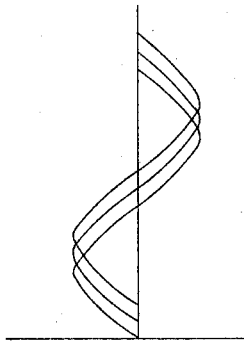
Figure 4:
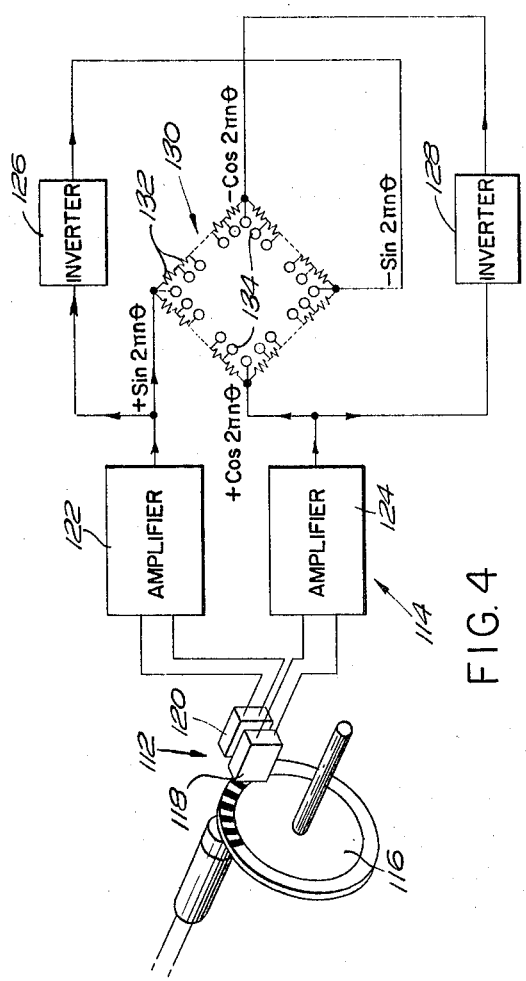
Figure 5:
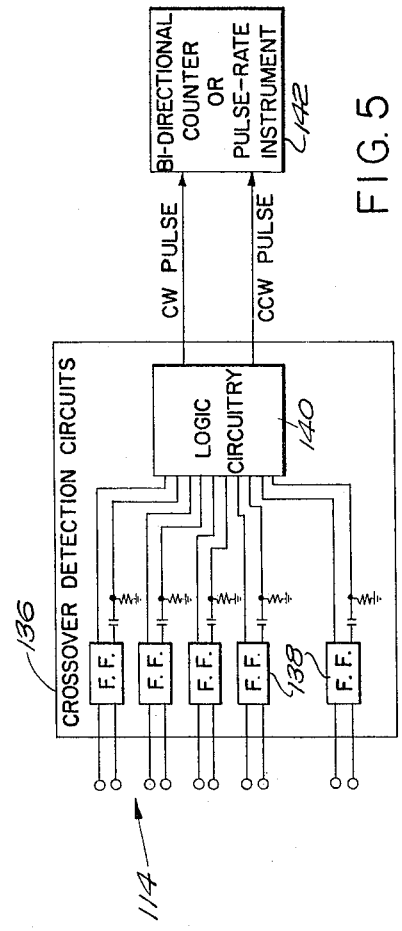

FIG. 3 graphically illustrates certain principles of the present invention;

FIG. 4 is a diagrammatic vew, partly in mechanical perspective and partly in electrical schematic, of another encoding system embodying the present invention;

FIG. 5 is an electrical diagram of an output logic circuit for the system of FIG. 4; and FIG. 6 graphically illustrates certain principles of the operation of the system of FIGS. 4 and 5.

Generally, each of the illustrated embodiments of the present invention comprises, as an encoder in cooperation with the output shaft of an instrument or the like, a disk presenting at its periphery a track of alternate opaque and transparent increments, a pair of photocells displaced from each other along the track by 90° in terms of one cycle of opaque and transparent increments and illumination for the code track in registration with slits for transmitting radiation to the photocells. Ordinarily the disk is composed of glass and the track is provided by silver halide photography in terms of silvered and clear regions of a gelatine stratum. Details of such an encoder are described, for example, in U.S. patent application Ser. No. 168,473, Patent No. 3,187,187, filed Jan. 25, 1962, in the name of Sidney A. Wingate, for Photoelectric Shaft Angle Encoder. The outputs of the photocells are a pair of analog position signals of the forms $E = E_m \sin 2\pi n\theta$, and $E = E_m \cos 2\pi n\theta$ where E is instantaneous amplitude, $E_m$ is maximum amplitude, $1/m$ is period duration and $\theta$ is instantaneous angular displacement.

Generally, each of the illustrated output systems comprises a pair of amplifying components for these analog position signals, a vector summing component for comparing the instantaneous amplitudes of the resulting signals and an indicating component for presenting the resulting information. It will be understood that the vector summing component of FIG. 1 includes the X and Y axis controls of a cathode ray tube and the indicating component includes the face of the cathode ray tube. It will be understood that the vector summing component of FIG. 2 is an electromechanical resolver and the indicating component includes a encoder. It will be understood that the vector summing component of FIGS. 3 and 4 is a resistor, or more broadly an impedance, matrix and the indicating component includes a flip-flop arrangement.

Figure 1:
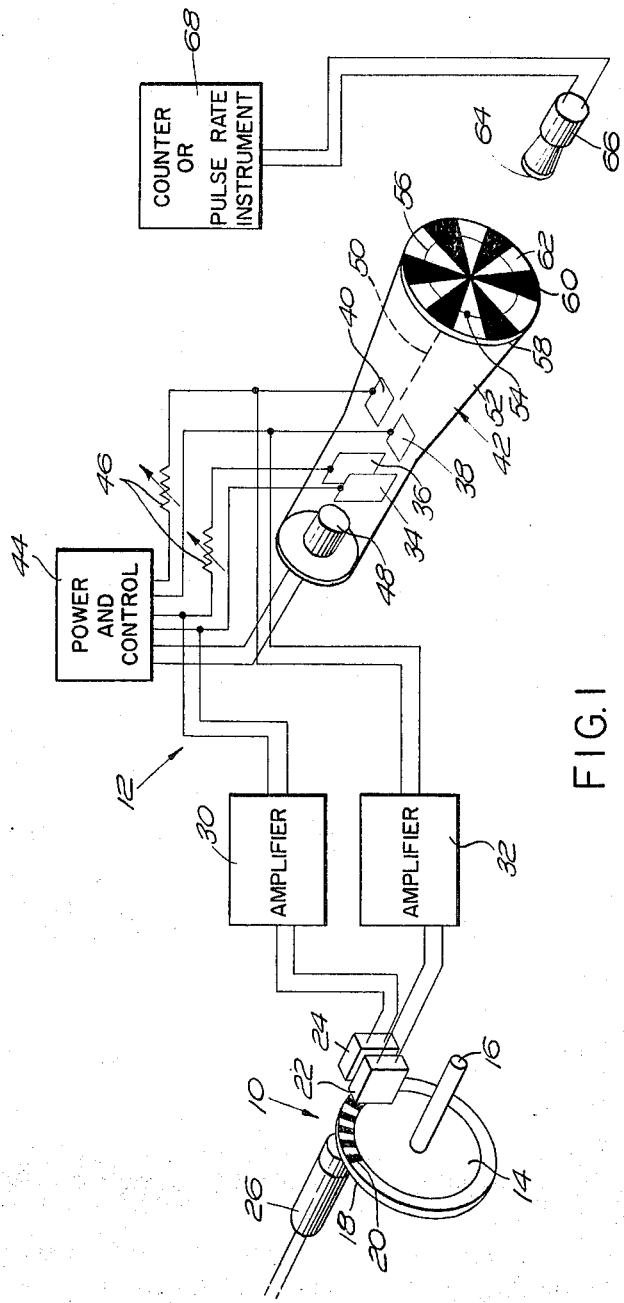
FIG. 1 is a diagrammatic view, partly in mechanical perspective and partly in electrical schematic, of an encoding system embodying the present invention.

The system of FIG. 1 generally comprises an encoder system 10 associated with any desired instrument and an output system 12. As shown, encoder system 10 includes a transparent glass disk 14 axially mounted on shaft 16 for rotation therewith and having at its periphery a track of alternately opaque and transparent increments 18 and 20. A pair of photocells 22 and 24, in registration with track 18, 20 are displaced in such a way that they are 90° from each other in terms of the phase of a single cycle of opaque and transparent increments. Sensing by photocells 22 and 24 of track 18, 20 occurs through slits (not shown) capable of resolving between adjacent opaque and transparent increments. In registration with photocells 22 and 24 is an illumination source 26.

The sinusoidal signals from photocells 22 and 24 are directed through a pair of stabilized direct current amplifiers 30 and 32 for utlization in the following manner.

These signals are applied respectively by amplifiers 30 and 32 to the X axis electrostatic plates 34, 36 and the Y axis electrostatic plates 38, 40 of a cathode ray tube 42. Cathode ray tube 42, as well as the remainder of the system, is suitably powered as at 44 and electrostatic plates 34, 36 and 38, 40 are adjustably biased as at 46. Cathode ray tube 42 has suitable electron emitting and electron accelerating gun 48 which generates an electron beam 50. Electron beam 50 impinges on the phosphorescent inner face 52 of cathode ray tube 42. In order to produce a spot of light 54, the out-of-phase signals impressed across electrostatic plates 34, 36 and 38, 40 produce a repetitive circular cycle 56. In front of face 52 is a mask 58 having an angular sequence of alternately opaque and transparent sectors 60 and 62. It is apparent that as spot of light 54 moves through its path, a series of light pulses are produced. These light pulses are focused by a suitable objective lens 64 onto a photomultiplier tube 66, the output of which is directed to a counter or a pulse rate meter 68. The counter or pulse rate meter indicates the instantaneous velocity or angle of shaft 16.

In operation of the combined system of FIG. 1, rotation of shaft 16 is accompanied by an analogous rotation of disk 14. In consequence, photocells 22 and 24 generate sinusoidal signals that are 90° out of phase. These signals, after amplification at 30 and 32, are applied across the electrostatic plates of the cathode ray tube 42. Bias controls 46 may be adjusted manually to compensate for inaccuracies in the system, including inaccuracies in the orientation or centering of disk 14. The resulting circle is chopped by mask 60, 62 to produce a series of pulses in photomultiplier 66 for application to counter or pulse rate meter 68. A series of substitute disks having sectors of selected shapes are provided for versatility.

The embodiment of FIG. 2 is a combination of a turntable of the type useful in the testing of gyroscopes and an encoding system, in accordance with the present invention, which serves to indicate very precisely the instantaneous velocity of the turntable. The turntable, shown generally at 70 includes a motor drive 72, an output shaft 74 and a mount 76 that is universally pivoted (not shown). Affixed to shaft 74 axially is an optical encoder 78 of the type described at 10 in FIG. 1. Optical encoder 78 has a track of alternate opaque and transparent regions 80, 82. In registration with track 80, 82 are: a pair of photocells 84, 86 spaced from each other in the manner of photocells 22, 24 of FIG. 1, and an associated illumination source 88.

In the embodiment of FIG. 2, resolution of the resulting sinusoidal signals is effected by modulating an audio carrier signal generated by an oscillator 92. The modulation is effected by a pair of modulators 94, 96, to which the carrier signal from oscillator 92 and the sinusoidal signals from photocells 84, 86 are applied. The output signals from modulators 94, 96 are applied to the input coils 98, 100 of an electromechanical resolver 102. The follower coil 104 of resolver 102 at any time assumes an orientation that is determined by the vector sum of audio signals. Follower coil 104 controls the output of a tachometer 106, via an amplifier 107 and a servo motor 108. A suitable encoder 110 of the same type as encoder 78 presents the resulting angular velocity information. FIG. 3 illustrates the sinusoidal signals applied to the mixers at $a$ and $b$ and the resulting modulated signals at $c$ and $d$.

In operation, for example, when the table is rotating at one earth rate, the encoder provides two signals at a frequency of one cycle per second. These signals are supressed carrier modulated at 400 cycles per second. The null of resolver 102 is tracked in such a way that an output rotation of 360° is established for a fifteen arc second rotation of the encoder. Thus a table angular velocity of one earth rate results in a servo shaft speed of 60 revolutions per minute. The high speed shaft velocity is measured by the tachometer and its angular excursion is measured by encoder 110. In the cited example, the original shaft rotation at one earth rate easily results in 1000 c.p.s. output by the encoder.

The embodiment of FIGS. 4 and 5 generally comprises an encoder system 112 associated with any desired instrument and an output system 114. As shown, encoder system 112 includes a coded disk 116, a pair of photocells 118, 120 and an illumination source, all similar to their counterparts in FIG. 1. The two resulting sinusoidal signals are amplified at 122 and 124. These two signals plus two additional signals produced thereby at inverters 126 and 128 constitute a total of four quadrature signals, which are applied to the four corners of a bridge network 130 of resistors 132. It will be understood that phase angle here is related to shaft position. By utilizing a sequence of oppositely positioned taps of bridge network 130, e.g. taps 134, a plurality of out of phase sinusoidal signals are produced as in FIG. 6. These signals are applied to conventional cross-over detection circuits 136 to provide a sequence of pulses, which are applied to a sequence of flip-flops 138. These flip-flops are suitably coupled to logic circuitry 140 for decoding in a suitable output 142.

In operation the logical circuitry distinguishes between the sequence of pulses representing clockwise rotation of the shaft and the sequence of pulses representing counter-clockwise rotation of the shaft. It will be understood that the number of sinusoidal signals of the type illustrated in FIG. 6 may be varied in accordance with the number of taps 134 available in bridge 130.

The present invention thus provides a simple but efficacious technique for increasing the resolution of an optical encoder beyond that normally resulting from limitation to a specified number of track increments. Since certain changes may be made in the foregoing disclosure without departing from the scope of the invention herein involved, it is intended that all matter contained in the foregoing disclosure or shown in the accompanying drawings shall be interpreted in an illustrative and not in a limiting sense.

What is claimed is:

1. A shaft angle encoding system comprising code track means, illumination means for directing radiation to said track means, two photocell means directed respectively toward two spaced positions of said track means, said track means having first regions for directing radiation to said photocell means and second regions for obscuring radiation from said photocell means, said first regions and said second regions being alternately sequenced, adjoining ones of said first means and said second means constituting analogous cycles, said track means and said two photocell means being constrained for relative motion into a sequence of relative analog positions, said spaced positions of said track being 90° out-of-phase in terms of said cycles so that said two photocell means produce two signals representing out-of-phase vectors for said sequence of relative analog positions, a phase dividing circuit a sequence of impedances, said two signals being applied to said sequence of impedances, a plurality of taps between adjacent impedances of said sequence, a plurality of signals of differing phase appearing at said taps, phase responsive means for producing digital signals representing said signals of differing phase and flip-flop output means for generating an indication of one of said digital signals for one of said relative analog positions.

2. A shaft encoding system comprising code means mounted for rotation on said shaft, said code means presenting a track, at least a pair of photocell means angularly spaced in registration with said track, illumination means for directing radiation to said track, said track having first regions for directing radiation to said photocell means and second regions for obscuring radiation from said photocell means, said first regions and said second regions being alternately sequenced, rotation of said code means causing said photocell means to produce at least a pair of out-of-phase signals, and vector summing means responsive to said signals to provide a representation of information relating to said shaft, said vector summing means including oscillator means for generating a signal of frequency that is high relative to the frequencies of said out-of-phase signals, mixer means for generating an output in the form of a pair of modulated carrier signals in response to said out-of-phase signals and said signal from said oscillator means and resolving means for said output of said mixer means.

3. A shaft encoding system comprising a code disk mounted for rotation on said shaft, said code disk presenting a track, a pair of photocells angularly spaced in registration with said track, illumination means for directing radiation to said track, said track having clear regions for directing radiation to said photocells and opaque regions for obscuring radiation from said photocells, said opaque regions and said clear regions being alternately sequenced, rotation of said code disk causing said photocells to produce a pair of out-of-phase substantially sinusoidal signals, and vector summing means responsive to said signals to provide a representation of information relating to said shaft, said vector summing means including means for inverting said pair of out-of-phase substantially sinusoidal signals in order to produce four quadrature substantially sinusoidal signals, a resistor bridge having four terminals for receiving said four quadrature substantially sinusoidal signals, and taps in said bridge, across which a plurality of out-of-phase substantially sinusoidal signals are generated.

4. The combination of a turntable and a shaft encoding system, said turntable comprising a drive means, an output shaft and a pivotal mount, said shaft encoding system comprising code means mounted for rotation on said shaft, said code means presenting a track, at least a pair of photocell means angularly spaced in registration with said track, illumination means for directing radiation to said track, said track having first regions for directing radiation to said photocell means and second regions for obscuring radiation from said photocell means, said first regions and said second regions being alternately sequenced, rotation of said code means causing said photocell means to produce at least a pair of out-of-phase signals, and vector summing means responsive to said signals to provide a representation of information relating to said shaft, said vector summing means including oscillator means for generating a signal of high frequency relative to the frequencies of said out-of-phase signals, and mixer means responsive to said signal from said oscillator means and said out-of-phase signals to produce modulated carrier signals.

5. The combination of claim 4 comprising a resolver for said modulated carrier signals.

6. A shaft encoding system comprising code means mounted for rotation on said shaft, said code means presenting a track, at least a pair of photocell means angularly spaced in registration with said track, illumination means for directing radiation to said track, said track having first regions for directing radiation to said photocell means and second regions for obscuring radiation from said photocell means, said first regions and said second regions being alternately sequenced, rotation of said code means causing said photocell means to produce at least a pair of out-of-phase signals, and vector summing means responsive to said signals to provide a representation of information relating to said shaft, said vector summing means including an impedence matrix including a plurality of impedances having a plurality of terminals, said out-of-phase signals being applied to certain ones of said plurality of terminals, the outputs of certain other of said plurality of terminals constituting said representation of information.

7. A shaft encoding system comprising a code disk mounted for rotation on said shaft, said code disk presenting a track, a pair of photocells angularly spaced in registration with said track, illumination means for directing radiation to said track, said track having clear regions for directing radiation to said photocells and opaque regions for obscuring radiation from said photocells, said opaque regions and said clear regions being alternately sequenced, rotation of said code disk means causing said photocells to produce a pair of out-of-phase substantially sinusoidal signals, and vector summing means responsive to said signals to provide a representation of information relating to said shaft, said vector summing means includes a cathode ray tube, having an X axis control responsive to one signal of said pair and a Y axis control responsive to the other signal of said pair, a mask for the face of said cathode ray tube for chopping the output thereof, and photocell means for receiving radiation through said mask and for transmitting pulses to a digital output means.

8. A shaft angle encoding system comprising code track means, illumination means for directing radiation to said track means, at least two photocell means directed respectively toward at least two spaced positions of said track means, said track means having first regions for directing radiation to said photocell means and second regions for obscuring radiation from said photocell means, said first regions and said second regions being alternately sequenced, adjoining ones of said first means and said second means constituting analogous cycles, said track means and said photocell means being constrained for relative motion into a sequence of relative analog positions, said spaced positions of said track means being out-of-phase in terms of said cycles so that said photocell means produce signals representing out-of-phase vectors for said sequence of relative analog positions, a phase dividing circuit having a matrix if impedances, said signals being applied to said matrix of impedances, a plurality of taps between adjacent impedances of said matrix, a plurality of signals of differing phase appearing at said taps, phase responsive means for producing signals representing said signals of differing phase and flip-flop output means for generating an indication of each of said sums for one each of said relative analog positions.

References Cited by the Examiner

UNITED STATES PATENTS

| | | | |
|---|---|---|---|
| 1,337,737 | 4/1920 | Van Der Bijl | 250—233 |
| 2,462,925 | 3/1949 | Varian | 250—220 X |
| 2,685,082 | 7/1954 | Beman et al. | 340—271 |
| 2,796,598 | 6/1957 | Cartwright | 340—271 |
| 2,930,895 | 3/1960 | Kuehne | 250—209 |
| 3,071,762 | 1/1963 | Morgan | 340—347 |
| 3,096,444 | 7/1963 | Seward | 250—233 X |

RALPH G. NILSON, *Primary Examiner.*

WALTER STOLWEIN, *Assistant Examiner.*

Disclaimer and Dedication 3,265,902.—*Sidney A. Wingate,* Concord, Mass. PHOTOELECTRIC SHAFT ANGLE ENCODER. Patent dated Aug. 9, 1966. Disclaimer and Dedication filed May 2, 1983, by the assignee, *Itek Corp.*

Hereby disclaims and dedicates to the Public the term of the patent subsequent to Mar. 15, 1983.

[*Official Gazette July 5, 1983.*]